United States Patent
Gutmann et al.

(10) Patent No.: US 11,796,000 B2
(45) Date of Patent: Oct. 24, 2023

(54) SINTERED BEARING BUSH MATERIAL, SLIDING BEARING, INTERNAL COMBUSTION ENGINE AND ELECTRIC MOTOR

(71) Applicant: Mahle International GmbH, Stuttgart (DE)

(72) Inventors: Andreas Gutmann, Zell im Wiesental (DE); Lilia Kurmanaeva, Schopfheim (DE); Patrick Sutter, Schopfheim (DE); Klaus Wintrich, Schopfheim (DE)

(73) Assignee: Mahle International GmbH

( * ) Notice: Subject to any disclaimer, the term of this patent is extended or adjusted under 35 U.S.C. 154(b) by 17 days.

(21) Appl. No.: 17/191,672

(22) Filed: Mar. 3, 2021

(65) Prior Publication Data

US 2021/0277944 A1   Sep. 9, 2021

(30) Foreign Application Priority Data

Mar. 4, 2020   (DE) .......................... 102020202739.0

(51) Int. Cl.
*F16C 33/12*   (2006.01)
*F16C 33/14*   (2006.01)
(Continued)

(52) U.S. Cl.
CPC .......... *F16C 33/121* (2013.01); *C22C 1/0433* (2013.01); *C22C 19/058* (2013.01); *C22C 33/0242* (2013.01); *C22C 38/001* (2013.01); *C22C 38/008* (2013.01); *C22C 38/02* (2013.01); *C22C 38/12* (2013.01); *C22C 38/16* (2013.01);
(Continued)

(58) Field of Classification Search
CPC ............ C22C 2200/00; C22C 33/0242; C22C 38/001; C22C 38/008; C22C 38/12; C22C 38/16; C22C 38/58; F16C 2202/10; F16C 2202/54; F16C 2204/64; F16C 2204/66; F16C 2204/72; F16C 2360/22;
(Continued)

(56) References Cited

U.S. PATENT DOCUMENTS 5,054,301 A   10/1991   Soga et al.
9,212,572 B2   12/2015   Fujitsuka et al.
(Continued)

FOREIGN PATENT DOCUMENTS

CN   1434225 A   8/2003
CN   102046828 A   5/2011
(Continued)

OTHER PUBLICATIONS

English abstract for DE-102013203443.
(Continued)

*Primary Examiner* — Jenny R Wu
(74) *Attorney, Agent, or Firm* — Fishman Stewart PLLC

(57) ABSTRACT

A sintered bearing bush material for a sliding bearing may include: 0.5 to 1.7 percentage by weight carbon; 0.2 to 1.2 percentage by weight manganese; 0.2 to 1.2 percentage by weight sulphur; 1.2 to 2.4 percentage by weight nickel; 1.0 to 2.1 percentage by weight molybdenum; 3.0 to 7.0 percentage by weight copper; 0.2 to 1.2 percentage by weight tin; 0 to 0.8 percentage by weight phosphorus; and a residual component.

20 Claims, 1 Drawing Sheet

(51) Int. Cl.
*C22C 1/04* (2023.01)
*C22C 19/05* (2006.01)
*C22C 33/02* (2006.01)
*C22C 38/00* (2006.01)
*C22C 38/02* (2006.01)
*C22C 38/12* (2006.01)
*C22C 38/16* (2006.01)
*C22C 38/18* (2006.01)
*C22C 38/58* (2006.01)

(52) U.S. Cl.
CPC .............. *C22C 38/18* (2013.01); *C22C 38/58* (2013.01); *F16C 33/14* (2013.01); *C22C 2200/00* (2013.01); *F16C 2204/52* (2013.01); *F16C 2204/64* (2013.01); *F16C 2204/66* (2013.01); *F16C 2204/72* (2013.01)

(58) Field of Classification Search
CPC .. F16C 2380/26; F16C 33/104; F16C 33/121; F16C 33/128; F16C 33/14; F16C 33/145
See application file for complete search history.

(56) References Cited

U.S. PATENT DOCUMENTS

| | | | |
|---|---|---|---|
| 9,637,811 B2* | 5/2017 | Fukae | .................. C22C 33/0221 |
| 2008/0146467 A1* | 6/2008 | Takayama | ............. F16C 33/121 |
| | | | 508/105 |
| 2010/0080725 A1 | 4/2010 | Fujitsuka et al. | |
| 2011/0052442 A1 | 3/2011 | Sherif | |
| 2015/0086411 A1 | 3/2015 | Steinert | |
| 2017/0037900 A1 | 2/2017 | Andler | |
| 2019/0381570 A1 | 12/2019 | Heckendorn | |
| 2021/0277936 A1* | 9/2021 | Geis | ...................... C22C 19/058 |

FOREIGN PATENT DOCUMENTS

| | | |
|---|---|---|
| CN | 104080939 A | 10/2014 |
| CN | 105908102 A | 8/2016 |
| CN | 106163705 A | 11/2016 |
| CN | 110184546 A | 8/2019 |
| CN | 110607491 A | 12/2019 |
| DE | 1044131 B | 11/1958 |
| DE | 102009041940 A1 | 7/2010 |
| DE | 102010055463 A1 | 7/2011 |
| DE | 102013203443 A1 | 8/2014 |
| GB | 2087436 A | 5/1982 |
| GB | 8514382 | 6/1985 |
| GB | 2176206 A | 12/1986 |

OTHER PUBLICATIONS

Chinese Search Report dated Aug. 2, 2022 for copending Chinese App No. 202110235553.5 (w_English_translation).

Chinese Office Action dated Aug. 8, 2022 for copending Chinese App. No. 202110235553.5 (w_English_translation).

* cited by examiner

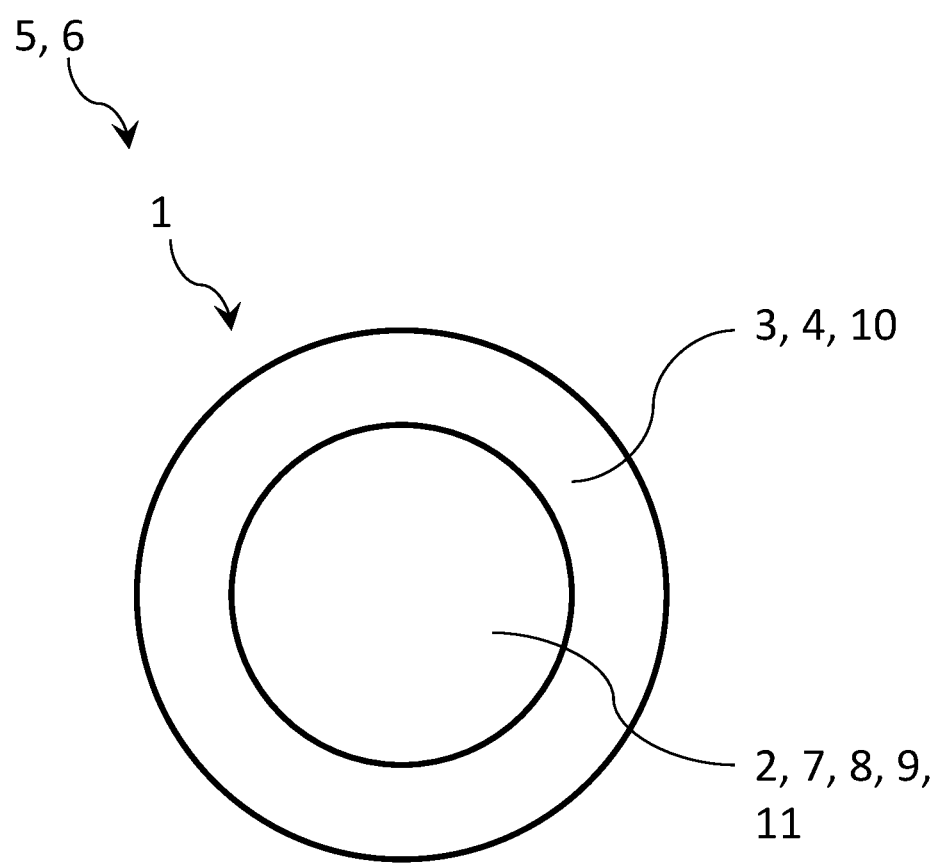

SINTERED BEARING BUSH MATERIAL, SLIDING BEARING, INTERNAL COMBUSTION ENGINE AND ELECTRIC MOTOR

CROSS-REFERENCE TO RELATED APPLICATIONS

This application claims priority to German Patent Application No. DE 10 2020 202 739.0, filed on Mar. 4, 2020, the contents of which are hereby incorporated by reference in their entirety.

TECHNICAL FIELD

The invention relates to a sintered bearing bush material for a sliding bearing and a sliding bearing with such a bearing bush material. In addition, the invention relates to an internal combustion engine with such a sliding bearing and an electric motor with such a sliding bearing.

BACKGROUND

In the case of sliding bearings with a shaft which is guided in a bearing bush in a sliding manner and movably relative to the bearing bush, for some time sintered materials have been used, which have good sliding characteristics and at the same time are wear-resistant and temperature-resistant. Thus, usually in internal combustion engines, gas exchange valves having a valve stem, wherein the valve stem forms the shaft of such a sliding bearing, are mounted in a bearing bush comprising a sintered bearing material. The bearing bush material of such a bearing bush is often impregnated with oil to improve the sliding characteristics. The shaft of the sliding bearing or respectively the valve stem functioning as shaft of the sliding bearing of the gas exchange valve of the internal combustion engine is usually coated here or nitrided, in order to improve a wear resistance of the valve stem or respectively of the shaft. Alternatively, bearing bushes are frequently used which, instead of a sintered bearing bush material, have a bearing bush material with a brass alloy or another non-ferrous metal alloy, wherein such brass or other non-ferrous metal bearing bushes are typically combined with uncoated shafts or respectively valve stems for the formation of the sliding bearing. Sintered bearing bush materials frequently have a solid lubricant or bronze component distributed uniformly in the bearing bush material. In particular for receiving the oil with which the bearing bush material can be impregnated, sintered bearing bush materials are usually not densely sintered and accordingly have a residual porosity, the proportion of which is able to be determined in a metallographic section of the bearing material by means of an image analysis at 10 to 25 percent of the bearing material. Here, conventional sintered bearing bush materials have a density of ca. 6.2 to 6.8 g per cm³, wherein the determining of the density of the bearing bush material takes place by the Archimedes' principle in accordance with DIN EN ISO 2738.

Despite the previously presented efforts to improve the sliding characteristics and the wear resistance of sintered bearing bush materials, a disadvantage of such conventional sintered bearing bush materials is to be seen in that optimum sliding characteristics and an optimum wear resistance are hitherto unattained.

SUMMARY

It is therefore an object of the present invention to indicate new ways for a sintered bearing bush material and for a sliding bearing with such a bearing bush material and internal combustion engines and electric motors each with such a sliding bearing—in particular with regard to the previously mentioned disadvantage.

This problem is solved by the subject matter of the independent claims. Preferred embodiments form the subject matter of the dependent claims.

Accordingly, the basic idea of the invention is to provide a sintered bearing bush material based on iron, which comprises carbon, manganese, sulphur, nickel, molybdenum, copper, tin, phosphorus and production-related impurities.

Tests have shown here that, compared to conventional bearing bush materials, in the case of the sintered bearing bush material according to the invention, a proportion of martensite in the structure and a proportion of solid lubricant is distinctly increased, accompanied by advantageously improved sliding characteristics and an improved wear resistance and temperature resistance.

A sintered bearing bush material according to the invention for a sliding bearing which is preferably able to be used for an internal combustion engine or an electric motor, corresponds to the composition which is described below. The sintered bearing bush material comprises 0.5 to 1.7 percentage by weight, preferably 0.5 to 1.3 percentage by weight, carbon. In addition, the sintered bearing bush material comprises 0.2 to 1.2 percentage by weight, in particular 0.2 to 0.9 percentage by weight, manganese. The sintered bearing bush material has, moreover, a proportion of sulphur of 0.2 to 0.12 percentage by weight, preferably 0.2 to 1.0 percentage by weight. The sintered bearing bush material further comprises nickel with a proportion of 1.2 to 2.4 percentage by weight, preferably 1.2 to 2.1 percentage by weight. Moreover, the sintered bearing bush material has a proportion of molybdenum of 1.0 to 2.1 percentage by weight, in particular 1.0 to 1.9 percentage by weight. In addition, the sintered bearing bush material has a proportion of copper of 3.0 to 7.0 percentage by weight, preferably 3.0 to 6.0 percentage by weight. A proportion of tin of the sintered bearing bush material amounts, furthermore, to 0.2 to 1.2 percentage by weight, in particular 0.2 to 0.8 percentage by weight. In addition, the sintered bearing bush material comprises phosphorus with a proportion of 0 to 0.8 percentage by weight, preferably 0 to 0.4 percentage by weight. In addition, the sintered bearing bush material has a residual component. Advantageously, thereby the increased wear- and temperature resistance and the improved sliding characteristics are achieved compared to conventional sintered bearing bush materials.

Expediently, the residual component of the sintered bearing bush material comprises a maximum of 0.2 percentage by weight impurities. These impurities can be contained, in a production-related manner, in the residual component of the sintered bearing bush material. Advantageously, it can thereby be ensured that the impurities do not impair the desirable characteristics of the sintered bearing bush material or only impair these to a tolerable extent.

In a preferred further development of the sintered bearing bush material, the residual component contains iron with a proportion of 83.4 percentage by weight to 94.9 percentage by weight. This enables advantageously a particularly impact-resistant formation of the sintered bearing bush material.

Expediently, the residual component of the sintered bearing bush material consists of iron and the impurities. Such a bearing bush material has particularly good sliding characteristics and a particularly good wear resistance.

According to a further advantageous further development of the sintered bearing bush material, the remaining weight proportion of the residual component of the bearing bush material is formed by iron. Iron is typically inexpensive to procure, which accordingly has a cost-reducing effect on the sintered bearing bush material per se.

According to a further advantageous further development of the sintered bearing bush material, the bearing bush material is produced from a powder mixture with at least three powder components and a pressing adjuvant. Here, at least one of the three powder components is a sulphidic solid lubricant. Alternatively or additionally, the bearing bush material is produced by means of sintering a green body, which has been formed by means of uniaxial pressing of the powder mixture before the sintering. Advantageously, a composite of the powder components to the bearing bush material can thus be achieved particularly well.

Expediently, the bearing bush material is sintered at a temperature of 1050° Celsius to 1150° Celsius and in a sinter atmosphere. The sinter atmosphere comprises here a mixture of hydrogen and nitrogen or consists of such a mixture. Alternatively, the sinter atmosphere comprises an endogas or consists of such an endogas. Advantageously, therefore, an undesired oxidizing of the bearing bush material during sintering is prevented.

According to a further advantageous further development, the sintered bearing bush material has a structure with a proportion of martensitic and bainitic structure components of at least 70 percent. This proportion of martensitic or respectively bainitic structure components is expediently able to be determined by means of an image analysis of a, particularly preferably etched, microsection sample. This martensite or respectively bainite proportion has a particularly advantageous effect on the wear resistance of the bearing bush material.

In a further preferred further development of the sintered bearing bush material, the bearing bush material has a residual porosity of at least 8 percent. Alternatively or additionally, the bearing bush material has a density of 6.2 to 6.9 g per cm$^3$. This proportion of the residual porosity on the bearing bush material is expediently able to be determined by means of an image analysis of a, particularly preferably etched, microsection sample. Alternatively or additionally, a volume of the residual porosity of the bearing bush material is filled to at least 30 percent, preferably at least 80 percent, with an oil. Thus, advantageously, the sliding characteristics of the bearing bush material can be distinctly improved.

According to a further preferred further development of the sintered bearing bush material, the oil is introduced into the residual porosity in an impregnating process at a pressure of one mbar to 1013.25 mbar, in particular 10 mbar to 250 mbar—therefore in an at least partial vacuum—and at an oil temperature of 40° Celsius to 110° Celsius, in particular 62° Celsius to 98° Celsius. This permits a particularly good filling of the residual porosity with the oil.

The invention relates furthermore to a sliding bearing which is preferably able to be used for an internal combustion engine or an electric motor. The sliding bearing comprises a shaft which has a shaft material. Here, the shaft is preferable coated or nitrided. The sliding bearing comprises in addition a bearing bush which has a bearing bush material, sintered according to the invention, in accordance with the above description. In the sliding bearing, the shaft is guided here in the bearing bush in a sliding manner and movably relative to the bearing bush. Expediently, the shaft is guided in the bearing bush in a sliding manner and movably relative to the bearing bush axially and/or rotatably. The advantages, indicated above, of the sintered bearing bush material according to the invention apply in an analogous manner also to the sliding bearing according to the invention with a bearing bush comprising such a bearing bush material.

According to a preferred further development of the sliding bearing, the shaft material corresponds to a composition indicated below. The shaft material has a proportion of carbon of 0.4 to 0.5 percentage by weight. In addition, the shaft material comprises a proportion of silicon of 2.7 to 3.3 percentage by weight. A manganese proportion of the shaft material amounts to 0 to 0.6 percentage by weight. The shaft material has a chromium proportion of 8 to 10 percentage by weight. A nickel proportion of the shaft material amounts to 0 to 0.5 percentage by weight. Furthermore, the shaft material comprises phosphorus with a proportion of 0 to 0.04 percentage by weight. In addition, the shaft material has a proportion of sulphur of 0 to 0.03 percentage by weight. The shaft material further comprises a residual component of iron and production-related impurities. Such a shaft material proves to be particularly favourably priced.

In a further advantageous further development of the sliding bearing, the shaft material corresponds alternatively to a composition described below. The shaft material comprises carbon with a proportion of 0.45 to 0.55 percentage by weight. In addition, the shaft material comprises silicon with a proportion of 0 to 0.45 percentage by weight. The shaft material has a proportion of manganese of 8 to 10 percentage by weight and a chromium proportion of 20 to 22 percentage by weight. The shaft material further comprises nickel with a proportion of 3.5 to 5.5 percentage by weight and phosphorus with a proportion of 0 to 0.04 percentage by weight. A proportion of sulphur of the shaft material amounts to 0 to 0.03 percentage by weight. The shaft material has further a proportion of nitrogen of 0.4 to 0.6 percentage by weight. In addition, the shaft material comprises niobium with a proportion of 1.8 to 2.5 percentage by weight. In addition, the shaft material has a tungsten proportion of 0.8 to 1.5 percentage by weight. The shaft material further comprises a residual component of iron and production-related impurities. Such a shaft material proves to be particularly wear-resistant.

According to a further advantageous further development of the sliding bearing, alternatively the shaft material corresponds to a composition indicated below. The shaft material has carbon with a proportion of 0 to 0.8 percentage by weight and silicon with a proportion of 0 to 0.5 percentage by weight. In addition, the shaft material comprises manganese with a proportion of 0 to 0.5 percentage by weight and chromium with a proportion of 13.5 to 15.5 percentage by weight. The shaft material further has a nickel proportion of 30 to 33.5 percentage by weight and phosphorus with a proportion of 0 to 0.015 percentage by weight. The shaft material has sulphur with a proportion of 0 to 0.01 percentage by weight. The shaft material comprises in addition aluminium with a proportion of 1.6 to 2.2 percentage by weight. Furthermore, the shaft material has niobium with a proportion of 0.4 to 0.9 percentage by weight. The shaft material further comprises titanium with a proportion of 2.3 to 2.9 percentage by weight and molybdenum with a proportion of 0.4 to 1.0 percentage by weight. In addition, the shaft material comprises a residual component of iron and production-related impurities. Advantageously, such a shaft material proves to be particularly heat-resistant.

In a further advantageous further development of the sliding bearing, alternatively the shaft material corresponds to a composition described below. The shaft material comprises carbon with a proportion of 0 to 0.13 percentage by weight and silicon with a proportion of 0 to 1 percentage by weight. In addition, the shaft material comprises a manganese proportion of 0 to 1 percentage by weight and chromium with a proportion of 18 to 21 percentage by weight. The shaft material comprises in addition cobalt with a proportion of 15 to 21 percentage by weight and phosphorus with a proportion of 0 to 0.015 percentage by weight. In addition, the shaft material has a sulphur proportion of 0 to 0.02 percentage by weight and aluminium with a proportion of 1 to 2 percentage by weight. Furthermore, the shaft material comprises copper with a proportion of 0 to 0.2 percentage by weight and titanium with a proportion of 2 to 3 percentage by weight. In addition, the shaft material comprises zirconium with a proportion of 0 to 0.015 percentage by weight and boron with a proportion of 0 to 0.2 percentage by weight. Furthermore, the shaft material has a proportion of iron with 0 to 1.5 percentage by weight. In addition, the shaft material of the shaft of the sliding bearing comprises a residual component of nickel and production-related impurities. Advantageously, such a shaft material proves to be particularly wear-resistant.

According to a further advantageous further development of the sliding bearing, alternatively the shaft material corresponds to a composition stated below. The shaft material has a carbon proportion of 0.25 to 0.35 percentage by weight and silicon with a proportion of 0 to 0.3 percentage by weight. In addition, the shaft material comprises manganese with a proportion of 4 to 6 percentage by weight and chromium with a proportion of 24 to 26 percentage by weight. Furthermore, the shaft material has nickel with a proportion of 10 to 13 percentage by weight and phosphorus with a proportion of 0 to 0.2 percentage by weight. The shaft material comprises sulphur with a proportion of 0 to 0.2 percentage by weight. The shaft material further has aluminium with a proportion of 0 to 0.5 percentage by weight and copper with a proportion of 0 to 0.5 percentage by weight. Furthermore, the shaft material comprises niobium with a proportion of 1.8 to 2.5 percentage by weight and nitrogen with a proportion of 0.5 to 0.7 percentage by weight. In addition, the shaft material has a residual component of iron and production-related impurities. Such a shaft material proves to be particularly corrosion-resistant.

In a further advantageous further development of the sliding bearing, alternatively the shaft material has a case-hardened steel or consists of such a case-hardened steel. Such a shaft material proves to be particularly favourably-priced.

The invention relates, in addition, to an internal combustion engine, preferably for a motor vehicle, which comprises a sliding bearing according to the preceding description. In addition, the internal combustion engine comprises at least one gas exchange valve, which has a valve stem. The valve stem of the gas exchange valve of the internal combustion engine forms here preferably the shaft of the sliding bearing. It shall be understood that the sliding bearing, according to the invention, of the internal combustion engine according to the invention is also able to be used for the sliding mounting of any other components of the internal combustion engine. The advantages indicated above of the sliding bearing according to the invention also apply, in an analogous manner, to the internal combustion engine according to the invention with such a sliding bearing.

In addition, the invention relates to an electric motor, in particular for a motor vehicle, which comprises a sliding bearing according to the invention in accordance with the above description. Furthermore, the electric motor comprises a stator and a rotor, wherein the rotor, in particular by means of the sliding bearing, is mounted on the stator in a rotatable manner relative to the stator. It shall be understood that the sliding bearing, according to the invention, of the electric motor according to the invention is also able to be used for the sliding mounting of any other components of the electric motor. The advantages, indicated above, of the sliding bearing according to the invention also apply, in an analogous manner, to the electric motor according to the invention with such a sliding bearing.

Further important features and advantages of the invention will emerge from the subclaims, from the drawing and from the associated FIGURE description with the aid of the drawing.

It shall be understood that the features mentioned above and to be explained further below are able to be used not only in the respectively indicated combination, but also in other combinations or in isolation, without departing form the scope of the present invention.

BRIEF DESCRIPTION OF THE DRAWINGS

Preferred example embodiments of the invention are illustrated in the drawing and are explained in closer detail in the following description.

DETAILED DESCRIPTION

The sole FIGURE shows in a rough schematic manner a sliding bearing 1 according to the invention in a radial section. The sliding bearing 1 comprises a shaft 2, which has a shaft material 7. The shaft 2 is coated or nitrided. The sliding bearing 1 further comprises a bearing bush 3, which has a sintered bearing bush material 4 according to the invention. The shaft 2 is guided in the bearing bush 3 in a sliding manner and movably relative to the bearing bush 3. In the example which is shown, the shaft 2 is guided in the bearing bush 3 movably relative to the bearing bush 3 axially and/or rotatably.

The FIGURE shows further in a rough schematic manner an internal combustion engine 5, which comprises the sliding bearing 1 according to the invention. In addition, the internal combustion engine 5 comprises a gas exchange valve 8, which has a valve stem 9. In the example shown in the FIGURE, the valve stem 9 forms the shaft 2 of the sliding bearing 1. The internal combustion engine 5 shown in the FIGURE can be part of a motor vehicle.

In addition, the FIGURE illustrates in a rough schematic manner an electric motor 6, which comprises the sliding bearing 1 according to the invention. The electric motor 6 has a stator 10 and a rotor 11, wherein in the example which is shown the rotor 11 is mounted on the stator 10 rotatably relative to the stator 10 by means of the sliding bearing 1. The electric motor 6 shown in the FIGURE can be part of a motor vehicle.

The sintered bearing bush material 4 for the sliding bearing 1 has a composition which is explained below. A proportion of carbon of the bearing bush material 4 amounts to 0.5 to 1.7 percentage by weight. For example, the carbon proportion of the bearing bush material 4 amounts to 0.5 to 1.3 percentage by weight. In addition, the sintered bearing bush material 4 has a proportion of manganese which amounts to 0.2 to 1.2 percentage by weight. In the example, the manganese proportion of the bearing bush material 4 amounts to 0.2 to 0.9 percentage by weight. Furthermore, the bearing bush material 4 comprises sulphur with a proportion of 0.2 to 1.2 percentage by weight of the bearing bush material 4. By way of example, the sulphur proportion of the bearing bush material 4 amounts to 0.2 to 1.0 percentage by weight. The sintered bearing bush material 4 comprises in addition a proportion of nickel of 1.2 to 2.4 percentage by weight of the bearing bush material 4. For example, the nickel proportion of the bearing bush material 4 amounts to 1.2 to 2.1 percentage by weight. The sintered bearing bush material 4 has further a proportion of molybdenum, which amounts to 1.0 to 2.1 percentage by weight. By way of example, the molybdenum proportion of the bearing bush material 4 amounts to 1.0 to 1.9 percentage by weight. The sintered bearing bush material 4 comprises, furthermore, a proportion of copper, which amounts to 3.0 to 7.0 percentage by weight. By way of example, the copper proportion of the bearing bush material 4 amounts to 0.2 to 0.8 percentage by weight. Furthermore, the sintered bearing bush material 4 comprises a proportion of tin, which amounts to 0.2 to 1.2 percentage by weight. In the example, the tin proportion of the bearing bush material 4 amounts to 0.2 to 0.8 percentage by weight. In addition, the sintered bearing bush material 4 has a proportion of phosphorus of 0 to 0.8 percentage by weight. In the example, the phosphorus proportion of the bearing bush material 4 amounts to 0 to 0.4 percentage by weight. In addition, the bearing bush material 4 comprises a residual component. The residual component contains iron. The residual component contains 83.4 percentage by weight to 94.9 percentage by weight iron. The residual component comprises impurities which, related to production, can be contained in the residual component. The residual component comprises a maximum of 0.2 percentage by weight impurities. The residual component consists for example of iron and the impurities. In the example, the remaining weight proportion of the bearing bush material 4 is formed by iron.

The bearing bush material 4 is produced from a powder mixture which comprises at least three powder components and a pressing adjuvant. One of the at least three powder components of the power mixture is a sulphidic solid lubricant. The bearing bush material 4 is produced by means of sintering of a green body, which has been formed by means of uniaxial pressing of the powder mixture. The bearing bush material 4 is sintered at a temperature of 1050° Celsius to 1150° Celsius. The bearing bush material 4 is sintered in a sinter atmosphere which comprises a mixture of hydrogen and nitrogen or consists of such a mixture. Alternatively, the sinter atmosphere comprises an endogas or consists of such.

The sintered bearing bush material 4 has a structure with at least 70 percent proportion of martensitic and bainitic structure components. The proportion of martensitic and bainitic structure components of the sintered bearing bush material 4 is able to be determined by means of image analysis. Such an image analysis for determining the martensitic or respectively bainitic structure components of the sintered bearing bush material 4 is applied in particular to a record of a microsection sample, which was expediently subjected to an etching process.

The bearing bush material 4 has a residual porosity of at least 8 percent. The bearing bush material 4 has a density of 6.2 to 6.9 g per cm$^3$. A volume of the residual porosity is filled to at least 30 percent with an oil. For example, the volume of the residual porosity is filled to at least 80 percent with oil. The oil is introduced into the residual porosity into an impregnating process. The oil is introduced into the residual porosity in the impregnating process at a pressure of 1 mbar to 1013.25 mbar, for example 10 mbar to 250 mbar, and at an oil temperature of 40° Celsius to 110° Celsius, for example 62° Celsius to 98° Celsius, into the residual porosity.

In the example of the sliding bearing 1 shown in the FIGURE, the shaft material 7 of the shaft 2 of the sliding bearing 1 corresponds to a composition which is stated below. Here, the shaft material 7 has a proportion of carbon of 0.4 to 0.5 percentage by weight of the shaft material 7. In addition, the shaft material 7 comprises a proportion of silicon of 2.7 to 3.3 percentage by weight of the shaft material 7. Furthermore, the shaft material 7 comprises a proportion of manganese of 0 to 6 percentage by weight of the shaft material 7. The shaft material 7 has, in addition, a proportion of chromium of 8 to 10 percentage by weight of the shaft material 7. Furthermore, the shaft material 7 has a proportion of nickel with 0 to 0.5 percentage by weight of the shaft material 7. A proportion of phosphorus is also present in the shaft material 7, which amounts to 0 to 0.04 percentage by weight. Furthermore, the shaft material 7 comprises a proportion of sulphur, which amounts to 0 to 0.03 percentage by weight. Furthermore, the shaft material 7 comprises a residual component of iron and production-related impurities.

Alternatively to the above composition of the shaft material 7, the shaft material 7 corresponds to a composition explained below. Accordingly, the shaft material 7 has a proportion of carbon with 0.45 to 0.55 percentage by weight of the shaft material 7. In addition, the shaft material 7 has a proportion of silicon of 0 to 0.45 percentage by weight of the shaft material 7. The shaft material 7 further comprises a proportion of manganese with 8 to 10 percentage by weight of the shaft material 7. Furthermore, the shaft material 7 has a proportion of chromium of 20 to 22 percentage by weight of the shaft material 7. In addition, the shaft material 7 comprises a proportion of nickel with 3.5 to 5.5 percentage by weight of the shaft material 7. The shaft material 7 comprises in addition a proportion of phosphorus, which amounts to 0 to 0.04 percentage by weight of the shaft material 7. The shaft material 7 comprises in addition a proportion of sulphur, the proportion of which amounts to 0 to 0.3 percentage by weight of the shaft material 7. The shaft material 7 further comprises a proportion of nitrogen, which amounts to 0.4 to 0.6 percentage by weight of the shaft material 7. Furthermore, in the shaft material 7 a proportion of niobium is present, which corresponds to 1.8 to 2.5 percentage by weight of the shaft material 7. In addition, the shaft material 7 comprises a proportion of tungsten with 0.8 to 1.4 percentage by weight of the shaft material 7. The shaft material 7 further comprises a residual component of iron and production-related impurities.

Alternatively to the compositions of the shaft material 7 indicated above, the shaft material 7 corresponds to a composition explained below. The shaft material 7 has a proportion of carbon of 0 to 0.08 percentage by weight. The shaft material 7 has, further, a proportion of silicon of 0 to 0.5 percentage by weight of the shaft material 7. In addition, the shaft material 7 comprises a proportion of manganese with 0 to 0.5 percentage by weight. A proportion of chromium of the shaft material 7 amounts to 13.5 to 15.5 percentage by weight. In addition, the shaft material 7 has a proportion of nickel which amounts to 30 to 33.5 percentage by weight. A proportion of phosphorus of the shaft material 7 amounts to 0 to 0.015 percentage by weight of the shaft material 7. Furthermore, the shaft material 7 has a proportion of sulphur which amounts to 0 to 0.01 percentage by weight. The shaft material 7 comprises in addition a proportion of aluminium, which makes up 1.6 to 2.2 percentage by weight of the shaft material 7. The shaft material 7 comprises furthermore a proportion of niobium, which amounts to 0.4 to 0.9 percentage by weight of the shaft material 7. In addition, the shaft material 7 comprises a proportion of titanium which corresponds to 2.3 to 2.9 percentage by weight of the shaft material 7. The shaft material 7 further has a proportion of molybdenum with 0.4 to 1.0 percentage by weight of the shaft material 7. In addition, the shaft material 7 comprises a residual component of iron and production-related impurities.

Alternatively to the compositions of the shaft material 7 explained above, the shaft material 7 corresponds to a composition described below. The shaft material 7 has a proportion of carbon of 0 to 0.13 percentage by weight. The shaft material 7 comprises in addition a proportion of silicon of 0 to 1 percentage by weight. In addition, the shaft material 7 has a proportion of manganese of 0 to 1 percentage by weight. A proportion of chromium of the shaft material 7 corresponds to 18 to 21 percentage by weight. In addition, the shaft material 7 comprises a proportion of cobalt which makes up 15 to 21 percentage by weight of the shaft material 7. A phosphorus proportion of the shaft material 7 corresponds to 0 to 0.015 percentage by weight. The shaft material 7 has, furthermore, a proportion of sulphur which amounts to 0 to 0.02 percentage by weight. The shaft material 7 further comprises a proportion of aluminium which amounts to 1 to 2 percentage by weight of the shaft material 7. The shaft material 7 further comprises a proportion of copper which amounts to 0 to 0.2 percentage by weight. A proportion of titanium of the shaft material 7 corresponds to 2 to 3 percentage by weight. The shaft material 7 has in addition a proportion of zirconium, which makes up 0 to 0.15 percentage by weight of the shaft material 7. The shaft material 7 further comprises a proportion of boron with 0.02 percentage by weight of the shaft material 7. The shaft material 7 comprises furthermore a proportion of iron with 0 to 1.5 percentage by weight. The shaft material 7 comprises in addition a residual component of nickel and production-related impurities.

Alternatively to the compositions of the shaft material 7 indicated above, the shaft material 7 corresponds to a composition explained below. The shaft material 7 has a proportion of carbon of 0.25 to 0.35 percentage by weight. In addition, the shaft material 7 has a proportion of silicon of 0 to 0.3 percentage by weight. The shaft material 7 comprises a proportion of manganese of 4 to 6 percentage by weight. The shaft material 7 has in addition a proportion of nickel of 10 to 13 percentage by weight. The shaft material 7 further comprises a proportion of phosphorus which amounts to 0 to 0.2 percentage by weight. The shaft material 7 has a proportion of sulphur of 0 to 0.2 percentage by weight. The shaft material 7 has furthermore a proportion of aluminium which amounts to 0 to 0.5 percentage by weight of the shaft material 7. In addition, the shaft material 7 comprises a proportion of copper with 0 to 0.5 percentage by weight of the shaft material 7. A proportion of niobium of the shaft material 7 amounts to 1.8 to 2.5 percentage by weight. The shaft material 7 further comprises a proportion of nitrogen of 0.5 to 0.7 percentage by weight. In addition, the shaft material 7 has a residual component of iron and production-related impurities.

Alternatively to the compositions of the shaft material 7 indicated above, the shaft material 7 comprises a case-hardened steel or is such a case-hardened steel.

The invention claimed is:

1. A sintered bearing bush material for a sliding bearing, comprising:

0.5 to 1.7 percentage by weight carbon;
0.2 to 1.2 percentage by weight manganese;
0.2 to 1.2 percentage by weight sulphur;
1.2 to 2.4 percentage by weight nickel;
1.0 to 2.1 percentage by weight molybdenum;
3.0 to 7.0 percentage by weight copper;
0.2 to 1.2 percentage by weight tin;
0 to 0.8 percentage by weight phosphorus; and
a residual component; and
wherein the residual component comprises a maximum of 0.2 percentage by weight impurities.

2. The sintered bearing bush material according to claim 1, wherein the residual component contains 83.4 percentage by weight to 94.9 percentage by weight iron.

3. The sintered bearing bush material according to claim 1, wherein the residual component consists of iron and impurities.

4. The sintered bearing bush material according to claim 1, wherein:
the bearing bush material is produced from a powder mixture with at least three powder components and a pressing adjuvant; and
one of the at least three powder components is a sulphidic solid lubricant.

5. The sintered bearing bush material according to claim 1, wherein the bearing bush material is sintered at a temperature of 1050° Celsius to 1150° Celsius and in a sinter atmosphere which comprises a mixture of hydrogen and nitrogen or which comprises an endogas.

6. The sintered bearing bush material according to claim 1, wherein the sintered bearing bush material has a structure including martensitic and bainitic structure components, which collectively account for an at least 70 volume percent proportion of the structure.

7. The sintered bearing bush material according to claim 1, wherein:
the bearing bush material has a residual porosity of at least 8 percent;
the bearing bush material has a density of 6.2 to 6.9 g/cm$^3$; and
a volume of the residual porosity is filled to at least 30 percent with an oil.

8. The sintered bearing bush material according to claim 1, comprising:
0.5 to 1.3 percentage by weight, carbon;
0.2 to 0.9 percentage by weight, manganese;
0.2 to 1.0 percentage by weight, sulphur;
1.2 to 2.1 percentage by weight, nickel;
1.0 to 1.9 percentage by weight, molybdenum;
3.0 to 6.0 percentage by weight, copper;
0.2 to 0.8 percentage by weight, tin; and
0 to 0.4 percentage by weight phosphorus.

9. A sliding bearing comprising:
a shaft, which has a shaft material; and
a bearing bush, which has a sintered bearing bush material according to claim 1;
wherein the shaft is guided in the bearing bush in a sliding manner and movably relative to the bearing bush.

10. The sliding bearing according to claim 9, wherein the shaft material includes:
0.4 to 0.5 percentage by weight carbon;
2.7 to 3.3 percentage by weight silicon;
0 to 0.6 percentage by weight manganese;
8 to 10 percentage by weight chromium;
0 to 0.5 percentage by weight nickel;
0 to 0.04 percentage by weight phosphorus;
0 to 0.03 percentage by weight sulphur; and residual component iron and production-related impurities.

11. The sliding bearing according to claim 9, wherein the shaft material includes:
0.45 to 0.55 percentage by weight carbon;
0 to 0.45 percentage by weight silicon;
8 to 10 percentage by weight manganese;
20 to 22 percentage by weight chromium;
3.5 to 5.5 percentage by weight nickel;
0 to 0.04 percentage by weight phosphorus;
0 to 0.03 percentage by weight sulphur;
0.4 to 0.6 percentage by weight nitrogen;
1.8 to 2.5 percentage by weight niobium;
0.8 to 1.5 percentage by weight tungsten; and
residual component iron and production-related impurities.

12. The sliding bearing according to claim 9, wherein the shaft material includes:
0 to 0.08 percentage by weight carbon;
0 to 0.5 percentage by weight silicon;
0 to 0.5 percentage by weight manganese;
13.5 to 15.5 percentage by weight chromium;
30 to 33.5 percentage by weight nickel;
0 to 0.015 percentage by weight phosphorus;
0 to 0.01 percentage by weight sulphur;
1.6 to 2.2 percentage by weight aluminium;
0.4 to 0.9 percentage by weight niobium;
2.3 to 2.9 percentage by weight titanium;
0.4 to 1.0 percentage by weight molybdenum; and
residual component iron and production-related impurities.

13. The sliding bearing according to claim 9, wherein the shaft material includes:
0 to 0.13 percentage by weight carbon;
0 to 1 percentage by weight silicon;
0 to 1 percentage by weight manganese;
18 to 21 percentage by weight chromium;
15 to 21 percentage by weight cobalt;
0 to 0.015 percentage by weight phosphorus;
0 to 0.02 percentage by weight sulphur;
1 to 2 percentage by weight aluminium;
0 to 0.2 percentage by weight copper;
2 to 3 percentage by weight titanium;
0 to 0.15 percentage by weight zirconium;
0 to 0.02 percentage by weight boron;
0 to 1.5 percentage by weight iron; and
residual component nickel and production-related impurities.

14. The sliding bearing according to claim 9, wherein the shaft material includes:
0.25 to 0.35 percentage by weight carbon;
0 to 0.3 percentage by weight silicon;
4 to 6 percentage by weight manganese;
24 to 26 percentage by weight chromium;
10 to 13 percentage by weight nickel;
0 to 0.2 percentage by weight phosphorus;
0 to 0.2 percentage by weight sulphur;
0 to 0.5 percentage by weight aluminium;
0 to 0.5 percentage by weight copper;
1.8 to 2.5 percentage by weight niobium;
0.5 to 0.7 percentage by weight nitrogen; and
residual component iron and production-related impurities.

15. An internal combustion engine comprising:
a sliding bearing according to claim 9; and
at least one gas exchange valve, which has a valve stem forming the shaft of the sliding bearing.

16. An electric motor comprising:
a sliding bearing according to claim 9; and
a stator and a rotor, wherein the rotor is mounted on the stator rotatably relative to the stator via the sliding bearing.

17. A sintered bearing bush material for a sliding bearing, comprising:
0.5 to 1.7 percentage by weight carbon;
0.2 to 1.2 percentage by weight manganese;
0.2 to 1.2 percentage by weight sulphur;
1.2 to 2.4 percentage by weight nickel;
1.0 to 2.1 percentage by weight molybdenum;
3.0 to 7.0 percentage by weight copper;
0.2 to 1.2 percentage by weight tin;
0 to 0.8 percentage by weight phosphorus; and
a residual component;
wherein the bearing bush material has a density of 6.2 to 6.9 g/cm$^3$; and
wherein the sintered bearing bush material has a structure including martensitic and bainitic structure components, which collectively account for an at least 70 volume percent proportion of the structure.

18. The sintered bearing bush material according to claim 17, wherein a volume of a residual porosity of the bearing bush material is filled to at least 80 percent with an oil.

19. The sintered bearing bush material according to claim 17, wherein:
the bearing bush material is produced from a powder mixture with at least three powder components and a pressing adjuvant; and
one of the at least three powder components is a sulphidic solid lubricant.

20. A sintered bearing bush material for a sliding bearing, comprising:
0.5 to 1.7 percentage by weight carbon;
0.2 to 1.2 percentage by weight manganese;
0.2 to 1.2 percentage by weight sulphur;
1.2 to 2.4 percentage by weight nickel;
1.0 to 2.1 percentage by weight molybdenum;
3.0 to 7.0 percentage by weight copper;
0.2 to 1.2 percentage by weight tin;
0 to 0.8 percentage by weight phosphorus; and
a residual component;
wherein the residual component comprises a maximum of 0.2 percentage by weight impurities; and
wherein a volume of a residual porosity of the bearing bush material is filled to at least 30 percent with an oil.

* * * * *